Nov. 15, 1966  L. T. LA BELLE  3,285,594

SHOCK ABSORBER

Filed June 1, 1964

INVENTOR.
Laurence T. LaBelle
BY
Atty.

United States Patent Office 3,285,594
Patented Nov. 15, 1966

3,285,594
SHOCK ABSORBER
Laurence T. La Belle, Westchester, Ill., assignor to W. H. Miner, Inc., Chicago, Ill., a corporation of Delaware
Filed June 1, 1964, Ser. No. 371,434
2 Claims. (Cl. 267—9)

My present invention relates to shock absorbers that may be used, for example, in shock absorbing systems of railway cars.

It is an object of my present invention to provide an improved shock absorber having high energy-absorption characteristics.

It is another object of my present invention to provide a shock absorber that may be used as an individual unit or in series with other units of the same type.

It is a further object of my present invention to provide a shock absorber which is inexpensive to farbricate and assemble, which may be readily installed in conventional railway cars, and which is efficient in operation.

In brief, a preferred embodiment of shock absorber of my present invention comprises a casing, radially expansible force transmitting means spaced radially inwardly of the casing, and spring means disposed intermediate of the casing and the force transmitting means. Upon radial expansion of the force transmitting means, the spring means is radially compressed for absorbing forces imposed on the force transmitting means.

More particularly, the force transmitting means is in the form of a plurality of circumferentially arranged arcuate shoe members, and the spring means is in the form of a resilient pad unit. In the specific embodiment of my invention disclosed herein, axially movable wedge means, which engages the shoe members, causes radially expansion of the shoe members in response to axial forces imposed on the wedge means. By reason of this arrangement, axial impact forces, which are received by the wedge means and translated to radial forces through the cooperation of the wedge means and shoe members, are absorbed by the resilient pad unit. Furthermore, since the elements of the shock absorber of my present invention are symmetrically arranged, the shock absorber may be used as an individual unit or in series with other units of the same type.

Now in order to acquaint those skilled in the art with the manner of constructing and using shock absorbers in accordance with the principles of my present invention, I shall describe in connection with the accompanying drawing, a preferred embodiment of my invention.

Figure 2:
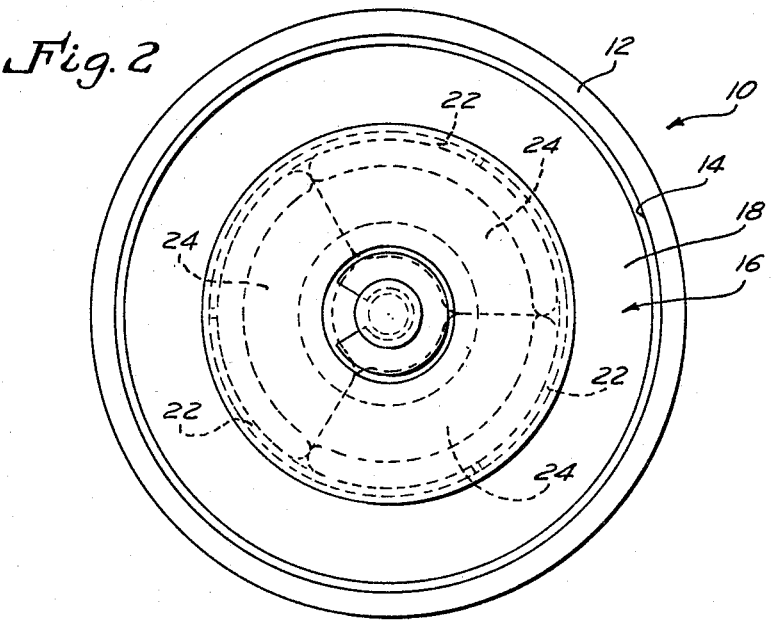
FIGURE 2 is an elevational view of the shock absorber of FIGURE 1.
Figure 1:
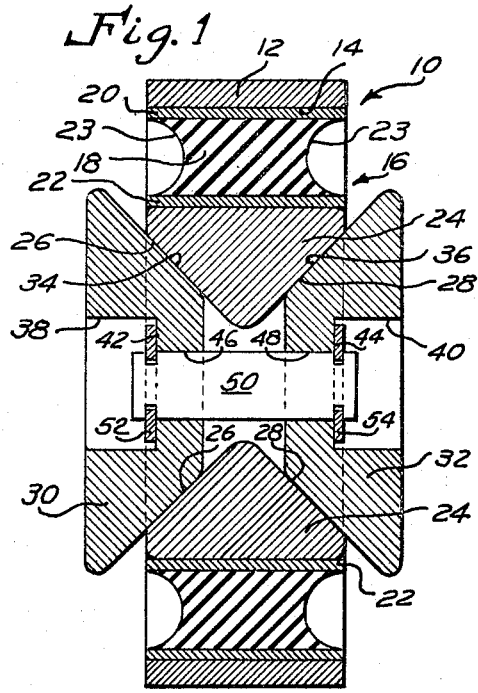
FIGURE 1 is a median longitudinal sectional view of the shock absorber of my present invention in an uncompressed condition.

Referring now to FIGURES 1 and 2, there is indicated generally by the reference numeral 10 a preferred embodiment of shock absorber of my present invention. The shock absorber 10 comprises a casing 12 having an annular inner surface 14. Positioned within the casing 12 is spring means in the form of a resilient annular pad unit indicated generally at 16. The pad unit 16 is comprised of an intermediate annular resilient rubber ring 18 mounted between an outer annular liner 20 and inner arcuate liner segments 22. Although three liner segments 22 are shown, this particular number of segments is not critical to my invention. Preferably, the outer liner 20, which engages the inner surface 14 of casing 12, and the inner liner segments 22 are of the same axial extent as the casing 12, while the resilient ring 18 is formed with annular recesses 23 in the axial facing sides thereof so that axial displacement or flow of the ring 18 when under radial compression may be accommodated entirely within the confines of the casing 12. Positioned within the resilient pad unit 16 is radially expansible force transmitting means comprised of three circumferentially arranged identical arcuate shoe members 24 having outer peripheries engaging the inner periphery of the inner liner segments 22 of the pad unit 16. The number of shoe members 24 may be varied if desired. Each shoe member 24 is formed with oposed axially facing arcuate bevelled surfaces 26 and 28.

Cooperatively associated with the shoe members 24 is wedge means in the from of a pair of axially spaced and movable identical wedge members 30 and 32. The wedge members 30 and 32 are provided with axially facing conical surfaces 34 and 36 which, respectively, frictionally engage the arcuate bevelled surfaces 26 and 28 of the shoe members 24. The wedge members 30 and 32 are also provided with central axial openings 38 and 40 that serve to define the outwardly facing internal shoulders 42 and 44, and central axial apertures 46 and 48 through which extends a rod member 50 that serves to guide the wedge members 30 and 32 during relative axial movement. Stop means in the form of snap rings 52 and 54 are secured to the rod member 50 adjacent the ends thereof and are engageable with the shoulders 42 and 44 of the wedge members 30 and 32.

When the shock absorber 10 is uncompressed, the elements thereof assume the positions shown in FIGURES 1 and 2. In this condition, the adjacent radial ends of the three shoe members 24 abut each other thus limiting radial contraction of the latter, and the shoulders 42 and 44 of the wedge members 30 and 32 abut the snap rings 52 and 54 thus limiting axial outward separation of the wedge members 30 and 32 and thereby maintaining the conical surfaces 34 and 36 of the wedge members 30 and 32 in frictional engagement with the arcuate bevelled surfaces 26 and 28 of the shoe members 24.

Figure 3:
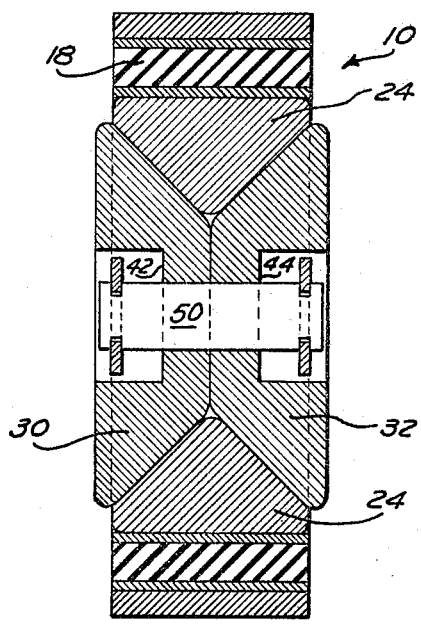
FIGURE 3 is a median longitudinal sectional view showing the shock absorber of FIGURE 1 in a compressed condition.

In an illustrative railway car installation, one of the wedge members, for example wedge member 30, is placed in abutment with a fixed frame member, and the other wedge member 32 is arranged to receive axial impact forces. When an axial impact force is imposed on the shock absorber 10 an equal and opposite axial force also acts thereon. By reason of this relationship, as the wedge member 32 is urged axially toward the wedge member 30 in response to an axial impact force, the shoe members 24 are expanded radially outwardly. Such outward expansion of the shoe members 24 is effected by the camming or wedging action resulting from the relative movement between the conical surfaces 34 and 36 of the wedge members 30 and 32 and the arcuate bevelled surfaces 26 and 28 of the shoe members 24. As the shoe members 24 radially expand and the resilient ring 18 is thereby radially compressed, the normal force of friction between the wedge members 30 and 32 and the shoe members 24 gradually increases until, for a particular magnitude of axial impact force, it reaches a maximum at which time further compression of the resilient ring 18 ceases. Thereafter further compression of the resilient ring 18 will occur only if the magnitude of the axial impact force increases. The axial impact forces, which are received by the shock absorber 10 and translated to radial forces, are absorbed by the resilient ring 18. When the shock absorber 10 is compressed, the elements thereof assume the positions shown in FIGURE 3. It is to be noted that as the resilient ring 18 is radially compressed, it is displaced or flows axially outwardly. After the impact force has been dissipated, the resilient ring 18 expands radially inwardly thereby returning the shock absorber to its uncompressed state shown in FIGURE 1.

From the foregoing description, it will be appreciated that I have provided an improved shock absorber which is efficient in operation and which has high energy-absorption characteristics. Also, due to its simplicity and compactness, the shock absorber is inexpensive to fabricate and assemble, and may be readily installed in conventional railway cars. Still further, because the elements of the shock absorber 10 are symmetrically arranged, the shock absorber may be used as an individual unit or in series with other units of the same type. When two or more shock absorbers 10 are to be used in series, a single rod member of the required length is disposed through the central apertures in all of the wedge members, the wedge members of adjacent units are arranged in abutting relation, and snap rings are secured at the ends of the rod members and are engageable with the shoulders of the outermost wedge members. In this connection, I have found that while the cumulative travel and energy-absorption capacity of a series of units is directly proportional to the number of units, the reaction of the series of units remains approximately equal to the reaction of a single unit. Thus, when two shock absorber units 10 are arranged in series, the travel and energy-absorption capacity of the two units is double that of a single unit, but the reaction of the two units approximates that of a single unit.

While I have shown and described what I believe to be a preferred embodiment of my present invention, it will be understood by those skilled in the art that various rearrangements and modifications may be made therein without departing from the spirit and scope of my invention.

I claim:

1. A shock absorber comprising a casing having an annular inner surface, a resilient annular pad unit comprised of an intermediate annular resilient ring mounted between an outer annular liner and inner arcuate liner segments, said outer liner of said pad unit engaging said inner surface of said casing, a plurality of circumferentially arranged arcuate shoe members having outer peripheries engaging said inner liner segments of said pad unit, said shoe members each having opposed axially facing arcuate bevelled surfaces, a pair of axially spaced movable wedge members having axially facing conical surfaces engaging said opposed axially facing bevelled surfaces of each of said shoe members and causing radial expansion only of said shoe members relative to said inner liner segments upon relative axial movement of said wedge members toward each other in response to axial forces imposed on at least one of said wedge members, and said resilient ring being radially compressible upon said radial expansion of said shoe members for absorbing forces imposed on the latter.

2. The combination of claim 1 characterized by guide rod means projecting axially through said wedge members and having stop means in the form of snap rings thereon for limiting axial outward separation of said wedge members.

References Cited by the Examiner
UNITED STATES PATENTS

| | | | |
|---|---|---|---|
| 2,136,440 | 11/1938 | Hufferd | 267—63 |
| 2,570,370 | 10/1951 | O'Connor | 267—9 |
| 3,134,585 | 5/1964 | Trask | 267—1 |
| 3,178,035 | 4/1965 | Peterson | 267—1 |

MILTON BUCHLER, *Primary Examiner.*

ARTHUR L. LA POINT, *Examiner.*

R. W. WOHLFARTH, *Assistant Examiner.*